United States Patent [19]

Shibauchi et al.

[11] Patent Number: 4,979,347

[45] Date of Patent: Dec. 25, 1990

[54] FILL- AND PACK IN A NON-GERM ATMOSPHERE MACHINE

[75] Inventors: Yoshito Shibauchi; Kohichi Hatanaka; Tatsuo Tanaka, all of Saitama; Katsuyuki Mogi, Kanagawa; Hironobu Terajima, Kanagawa; Tadashi Hanada, Kanagawa; Mamoru Fujita, Tokyo, all of Japan

[73] Assignees: Snow Brand Milk Products Co., Ltd., Sapporo; Yoshino Kogyosho Co., Ltd., Tokyo, both of Japan

[21] Appl. No.: 351,034

[22] Filed: May 12, 1989

[30] Foreign Application Priority Data

| | | | |
|---|---|---|---|
| May 19, 1988 | [JP] | Japan | 63-122756 |
| Jun. 22, 1988 | [JP] | Japan | 63-154199 |
| Jul. 28, 1988 | [JP] | Japan | 63-189091 |

[51] Int. Cl.5 .......... B65B 55/08; B65B 51/10; B65B 61/00; B65G 37/00

[52] U.S. Cl. .......... 53/167; 53/282; 53/300; 198/733; 198/740; 422/304

[58] Field of Search .......... 53/425, 426, 167, 300, 53/471, 282; 198/728, 730, 733, 739, 740; 422/304

[56] References Cited

U.S. PATENT DOCUMENTS

| | | | |
|---|---|---|---|
| 3,382,965 | 5/1968 | Pierce, Jr. et al. | 198/733 X |
| 3,590,975 | 7/1971 | Hollenton | 198/740 X |
| 3,613,331 | 10/1971 | Garrett | 198/740 X |
| 3,747,296 | 7/1973 | Zausner | 422/304 X |
| 3,766,709 | 10/1973 | Zausner | 422/304 X |
| 4,019,624 | 4/1977 | Torres | 198/728 X |
| 4,306,401 | 12/1981 | Stohlquist et al. | 198/740 X |
| 4,524,860 | 6/1985 | Misawa et al. | 198/740 |
| 4,722,295 | 2/1988 | Young | 198/740 X |

FOREIGN PATENT DOCUMENTS 62-287833 12/1987 Japan .

*Primary Examiner*—Horace M. Culver
*Attorney, Agent, or Firm*—Oliff & Berridge

[57] ABSTRACT

A machine for packaging is a non-germ atmosphere according to the present invention comprises a container sterilization means which sterilizes containers, and a fill-end-pack means which fills the food in the containers and seals them with lids. At least a pair of rails runs through the container sterilization means and the fill-and-pack means. The containers are hung by the rails and they are intermittently carried by a first intermittent carrying means and the container sterilization means and by a second intermittent carrying means in the fill-and-pack means. The machine is arranged such that it is readily adjustable for different sized containers without allowing germs in the atmosphere to enter into the machine. The container sterilization means for further comprises an air current control means to control the flow of the sterilization agent and to fully sterilize the containers.

18 Claims, 17 Drawing Sheets

FILL- AND PACK IN A NON-GERM ATMOSPHERE MACHINE

BACKGROUND OF THE INVENTION

The present invention relates to machine for packaging in a non-germ atmosphere which is distinguished by a container sterilization means and a filling and packing means in a non-germ atmosphere.

A method of filling the sterilized food in a sterilized container in a non-germ atmosphere is considered better than a method of filling the food in an cleaned atmosphere which still contains germs for the following reasons.

(1) Food is sterilized with high temperature in a very short time, so that the quality of the food remains good for a long time.

(2) Since food is sterilized and contains no germs, it can be kept at normal temperature.

(3) Keeping food cold is unnecessary, so that energy otherwise needed for cooling the food can be saved.

(4) Food can be filled in a bigger container than a can for canned food, so that it is economical.

(5) Food can be saved in a warehouse and on a shelf for a long time, so that production of the food can well be planned.

(6) Since the containers are sterilized before food is filled, they do not have to be heat-proof as compared to the heat required for canned food and retort food.

For the reasons described above, the method of filling the sterilized food in a sterilized container in a non-germ atmosphere is widely applied for filling many kind of foods.

The prior art of this method is largely separated into two sections, a container sterilization section and a filling and packing section. In the former section, containers are sterilized as they are carried through a sterilization atmosphere. In the latter section, food is filled in the sterilized containers and the containers are sealed with sterilized lids as the containers are carried to each position in a non-germ atmosphere, a food filling position, a lid providing position and a lid sealing position.

One prior art disclosure of machine for packaging in a non-germ atmosphere is described in Japanese Patent Provisional Publication No. 55-163134 wherein food is filled after containers are sterilized and dried while they are carried by a conveyer. Another prior art disclosure is Japanese Patent Provisional Publication No. 62-287833 which describes a method such that each container, which is airtightly segregated from others, is carried and it is sterilized, dried and filled with food.

The above-mentioned two prior art references, however, can be applied only to uniformly sized containers. To apply them to a different sized container, the conveyer has to be replaced. Although in the latter prior art, the machine described is one that can be adjustable to a different sized container, it has the problem that an atmosphere wherein containers are sterilized and dried and an atmosphere wherein food is filled in the containers cannot be airtightly divided. Also in this prior art reference, washing the lid sealing means, the sterilization of the containers and maintenance work of the machine are disturbed by a carrying means. Further, positioning the containers for sealing is rather difficult, so that sealing is often done improperly.

In the prior art of machines for packaging in a non-germ atmosphere, the machines are arranged so that containers are carried with intermittent stopping at a position such as a food filling position and a lid sealing position. A typical intermittent carrying means applied in a fill-and-pack in a non-germ atmosphere machine is described in Japanese Patent Provisional Publication No. 59-115220. In this means, holder plates are secured at regular intervals to the endless chain which rotates in the non-germ chamber, a container holder is secured to each holder plate, and a container is hung at the flange by the container holder.

The problem of the prior art is that the machine is only applicable for uniformly sized containers so that when it is applied to a different sized container, the container holders have to be replaced.

Replacing the holders takes a lot of time and requires hard work. It further disrupts the non-germ atmosphere. Recreating a non-germ atmosphere also takes time and requires extra work.

The first object of the present invention therefore is to provide a machine that can be applied to different sized containers without replacing any elements or without disrupting a non-germ atmosphere.

In a machine for packaging in a non-germ atmosphere, preventing a sterilization agent from staying in a container and from leaking in the non-germ atmosphere is essential to keep the food good for a long time.

Japanese Patent Provisional Publication describes a prior art wherein a room for sterilizing containers is segregated from the room for filling food and sealing lids, and through a opening mouth, which connects both rooms, the sterilized containers are carried from the former room to the latter room. The pressure in the room for filling food and sealing lids is arranged higher than the room for sterilizing containers, so that a sterilization agent is prevented from leaking in the room for filling food and sealing lids.

The problem of this prior art is that the sterilized containers cannot completely be dried, so that some of the sterilization agent would remain on the surface of the containers.

The containers are sterilized in such a manner that a liquidized sterilization agent is atomized and is sprayed to the containers. Then by blowing hot wind on the containers, the sterilization agent on the surface of the containers is evaporated. However, since the sterilization agent is atomized and is floating in the container sterilization room, even though the sterilization agent remained on the surface of the containers is blown away, the remaining atomized sterilization agent in the room would stick to the containers.

Another problem of the prior art is that it is often difficult to evenly spray the atomized sterilization agent on the containers, so that some portions of the containers would remain unsterilized.

The second object of the present invention therefore is to control the air flow in the container sterilization room, so that the atomized sterilization agent is prevented from spreading too broadly so that the whole surface of the containers can perfectly be sterilized.

DETAILED DESCRIPTION OF THE INVENTION

Figure 1:
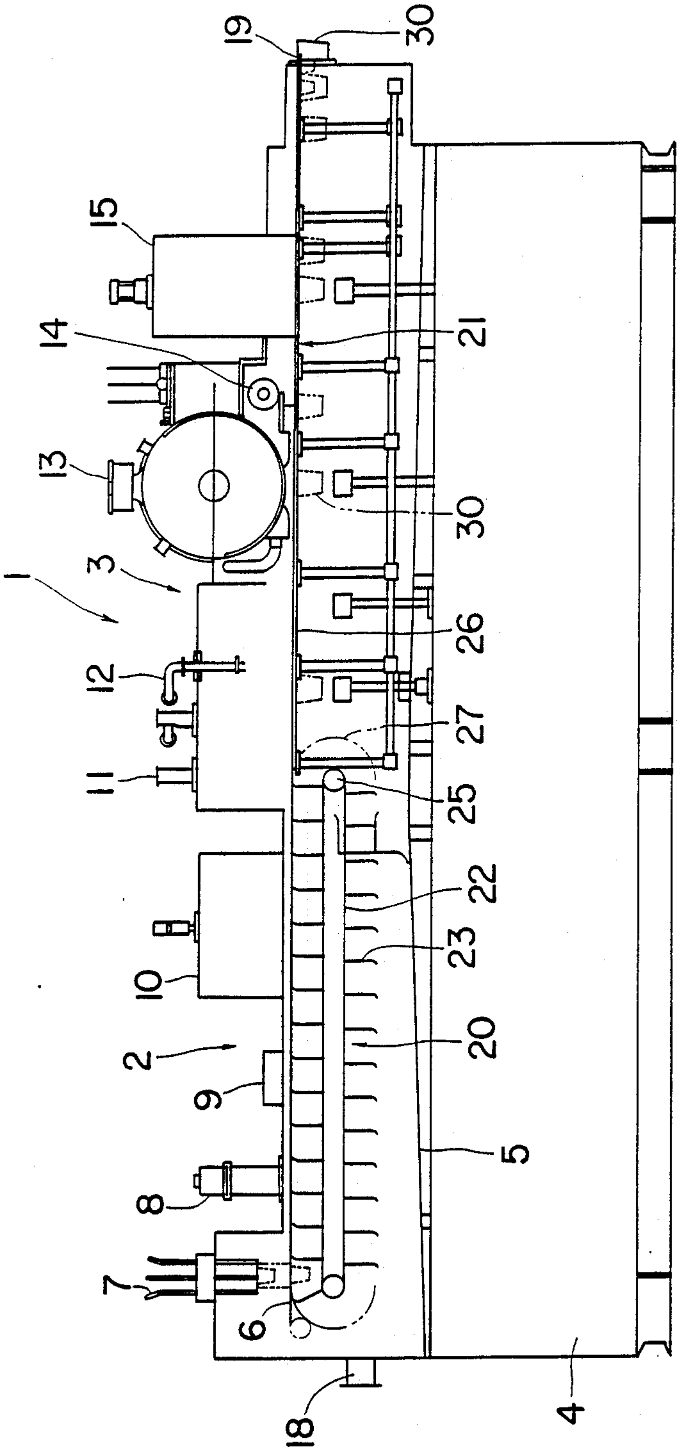
FIG. 1 is an elevational view of a preferred embodiment of a machine for packaging in a non-germ atmosphere according to the present invention.
Figure 2:
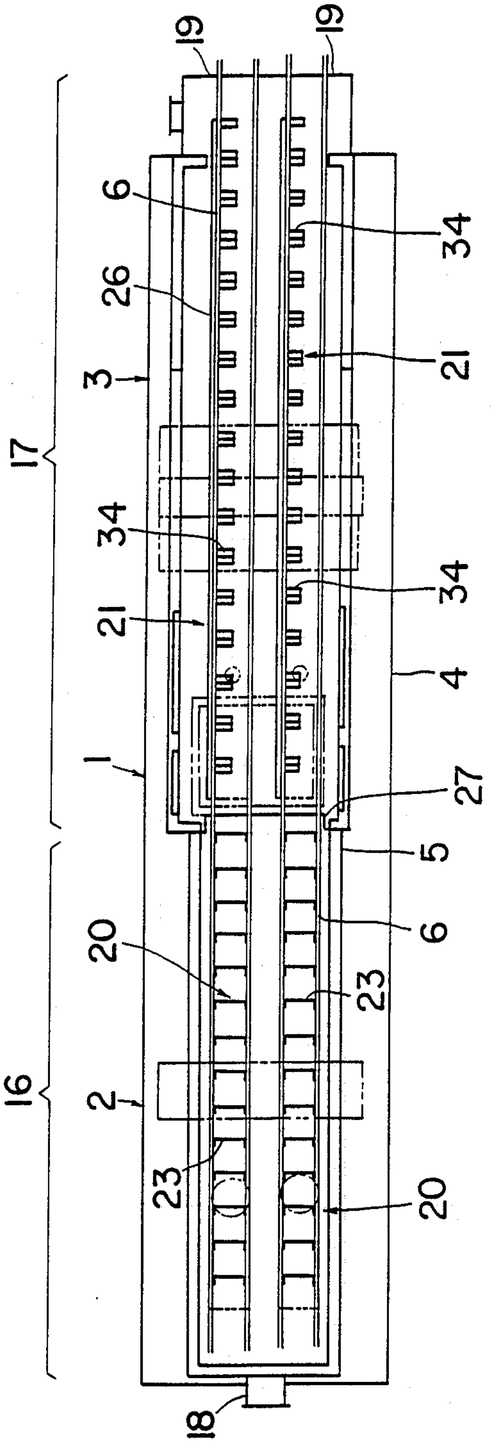
FIG. 2 is a top view of an intermittent carrying means comprised in the embodiment shown in FIG. 1.
Figure 3:
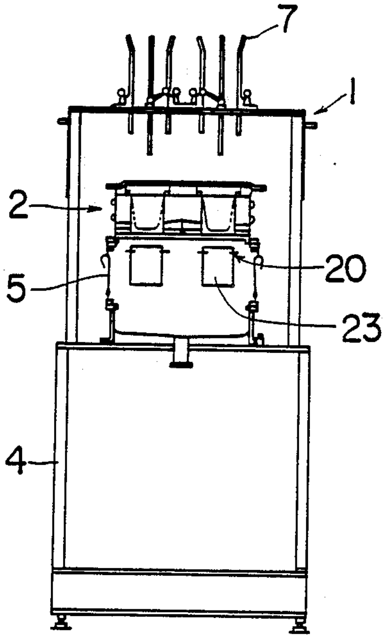
FIG. 3 and 4 are side elevational views of the embodiment shown in FIG. 1.
Figure 4:
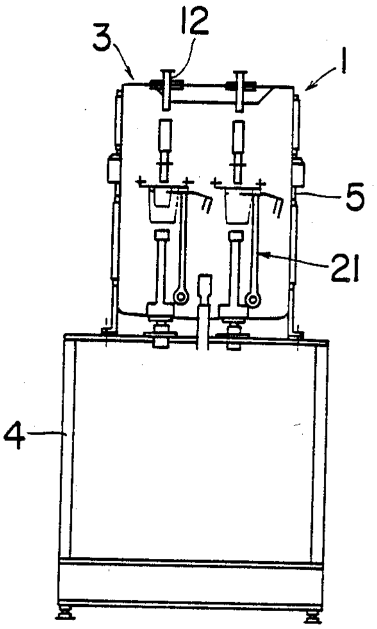

First, a means that accomplishes the first object of the present invention will be described below referring the corresponding drawings.

FIGS. 1 to 4 show the entire body of a machine for packaging in a non-germ atmosphere according to the present invention, wherein a base framework 4 comprising driving functions is positioned on a sealed framework, and two pairs of rails are installed in parallel in the sealed framework. A container sterilization means forming a container sterilization zone 16 is positioned in the front half of the sealed framework 5, and a fill-and-pack means forming a fill-and-pack zone 17 is positioned in the back half of the sealed framework 5.

A sucking duct is installed to an end wall of the sealed framework 5 to exhaust the air in the container sterilization zone 16 to an operating room (not shown in the drawings), and a carry-out mouth 19 is positioned in the other end wall of the sealed framework 5 to carry out containers, which have been filled with food and sealed by lids, by sliding on rails.

The container sterilization means 2 comprises a container supplier 7, a sterilization dispatcher 8, an ultraviolet rays apply mouth 9 and a hot wind blow duct 10, consecutively on the sealed framework 5.

The container supplier 7 drops a container on the rails 6 corresponding to the intermittent motion of a pushing plate 23 of the first intermittent carrying means 20. The sterilization dispatcher 8 atomizes a liquid sterilization agent such as hydrogen peroxide and sprays it to a container 30 carried underneath. The ultraviolet rays apply means 9 applies ultraviolet rays to a container 30 to accomplish sterilization of the container 30. The hot wind blow duct 10 blows hot wind to the container 30 to dry the container 30.

The fill-and-pack means 3 comprises a non-germ air supply mouth 11, a filling means 12, a lid sterilization means 13 and a press-sealing means 15, in order along the carrying direction. In the sealed framework 5, a temporal sealing means 14 is positioned right above the lid supply position, and a positioning means (not shown in the drawings), which adjust proper position of the container, is installed right above the food filling position and the lid supply sealing position.

Through the non-germ air supply mouth, the non-germ air is continuously supplied so that the pressure in the fill-and-pack zone 17 is kept higher than that of in the container sterilization zone 16 or outside. Therefore, the outside air containing germs is prevented from leaking into the fill-and-pack zone 17, and also the air in the container sterilization zone 16 which contain atomized sterilization agent is prevented from leaking in the zone 17.

The filling means 12 fills food in a container 30 which has been carried and briefly stopped beneath the filling means 12. The lid sterilization means 13 places a seat-like lid which has already been sterilized on the flange 31 of the container 30. The press-sealing means 15 hot-presses the lid on the container 30 and seals the container 30 with the lid. The temporal sealing means 14 temporarily seals the lid on the container 30 by hot-pressing some spots on the lid to prevent the lid from sliding from its proper position that has properly been adjusted by the lid sterilization means 13. The positioning means (not shown in the drawings) adjust positions of the container 30 at the filling position, the lid sterilization position and the sealing position. It also supports the container 30 from underneath at each said position.

Figure 5:
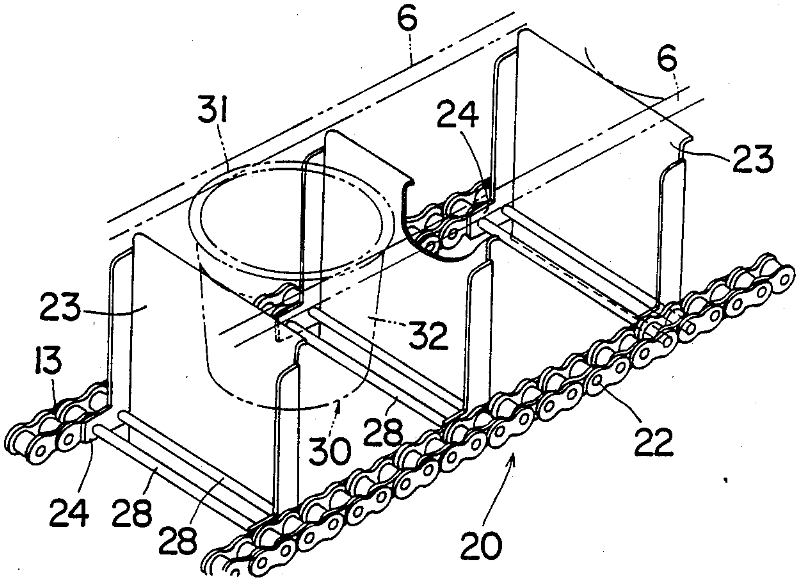
FIG. 5 is a partly enlarged perspective view of a first intermittent carrying means positioned in a container sterilization means.
Figure 6:
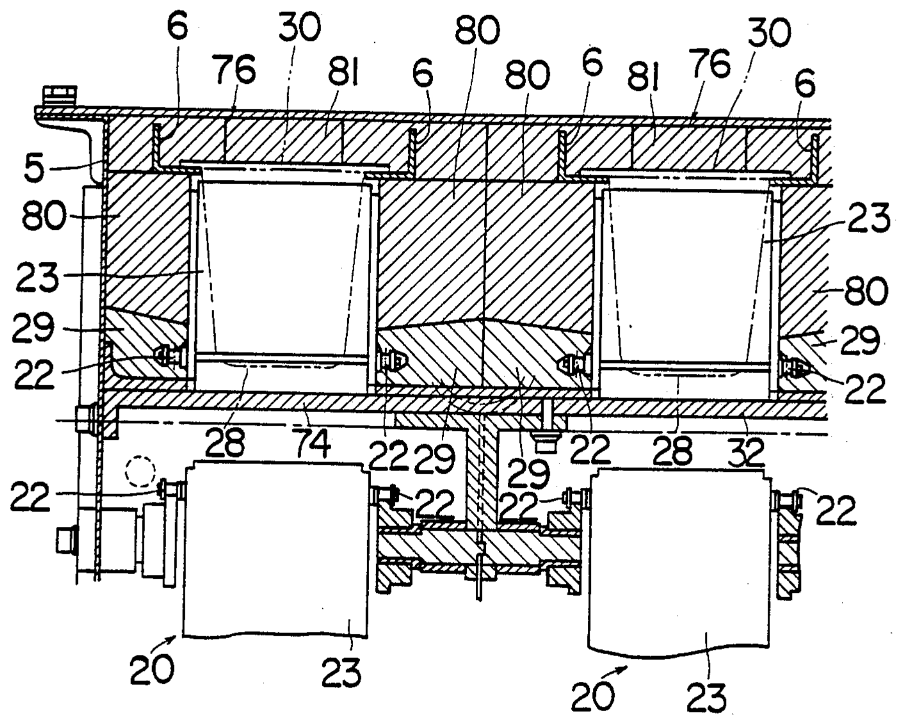
FIG. 6 is a side elevational view of the embodiment shown in FIG. 5.

The first intermittent carrying means 20 is positioned right below the pair of rails 6 in the container sterilization zone 16, and wherein, as shown in FIG. 5, two connection rods 28 are connected between the legs 24 of the pushing plate 23 which is secured between the endless chains 22. The bar shaped chain guide 29, as shown in FIG. 6, is provided to prevent the chains 22 from shaking.

The first intermittent carrying means 20 is arranged such that the pushing plate 23 is forwarded intermittently as the sproket 25 is driven intermittently by a power source (not shown in the drawings), so that a container 30 hung by the rails 6 is pushed by the pushing plate 23 and is carried intermittently.

Figure 8:
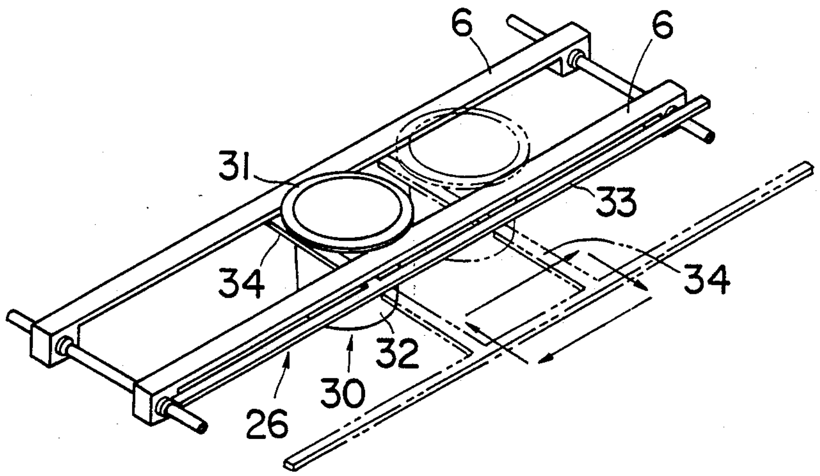
FIG. 8 is a segmentary enlarged perspective view of the embodiment shown in FIG. 7.
Figure 7:
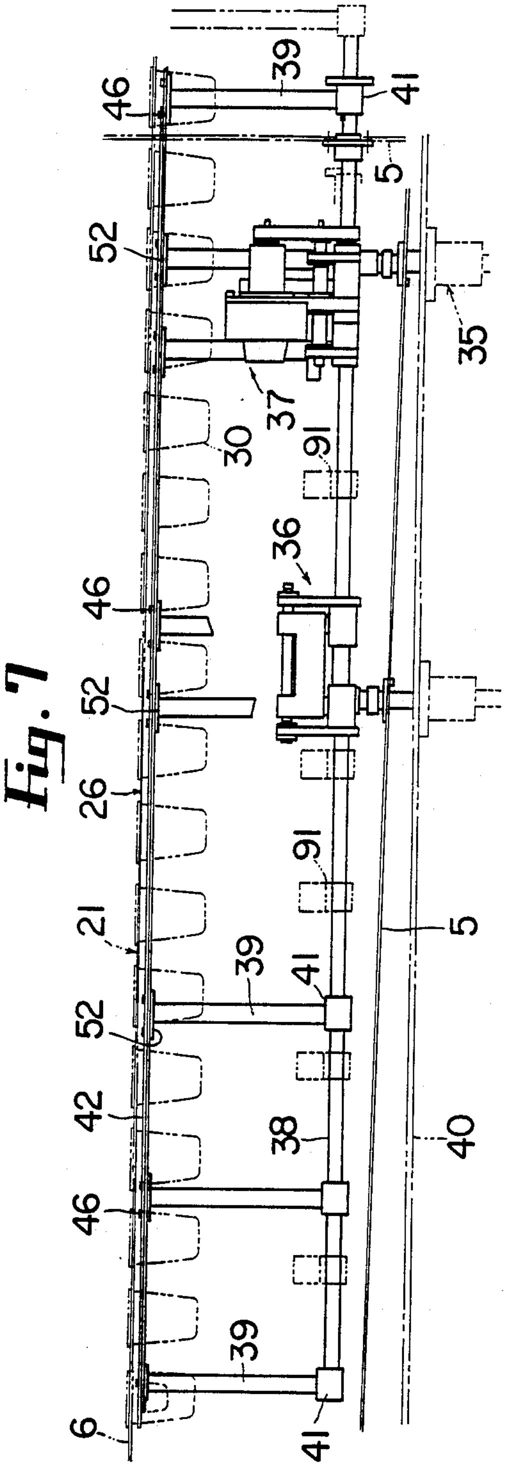
FIG. 7 is an elevational view of a preferred embodiment of a second intermittent carrying means positioned in a fill-and-pack means.

As shown in FIGS. 7 and 8, the second intermittent carrying means 21 is arranged such that the work shaft 38 is rotatably positioned parallel to the carrying direction of the container 30 in the sealed framework 5, and the comb-like teeth 26 is secured to the work shaft 38 via the moving arm 39. The comb-like teeth 26 comprises a long-plate shaped base plate 43 and teeth 44, the teeth being protruded from the base plate 43. The teeth directly pushes the container 30 intermittently carrying the container 30. The teeth plate 26 makes a round trip motion along the carrying direction as the work shaft 38 is driven by the forwarding means 35 and makes a round trip motion along the carrying directions. The teeth 44 makes a back and forth motion at a right angular to the carrying direction as the work shaft 38 is rotated by the putting-in-and-out means 36.

The remarkable fact in the present invention is that since the second intermittent carrying means 21 carries the container 30 by the way described above and it is positioned away from the container when food is filled, a lid is provided and temporarily sealed and the lid is hot-pressed, the position of the container at each said procedure can properly be adjusted by the positioning means.

A dividing plate 27 is positioned between the container sterilization zone 16 and the fill-and-pack zone 17 to prevent the air in the container sterilization zone 16 which contains an atomized sterilization agent from leaking into the fill-and-pack zone 17. The dividing plate 27 has an opening through which a container 30 is carried. Although the container sterilization zone 16 and the fill-and-pack zone 17 are connected by the opening of the dividing plate 27, the air in the container sterilization zone 16 does not leak into the fill-and-pack zone 17 because the air pressure in the fill-and-pack zone 17 is arranged higher than that in the container sterilization zone 16. Since the non-germ air in the fill-and-pack zone 17 is continuously flowing in the container sterilization zone 16, the air in the container sterilization zone 16 flows in certain directions preventing the atomized sterilization agent in the air from spreading wide.

The second intermittent carrying means 21 which is mentioned above will be described in detail below.

Figure 9:
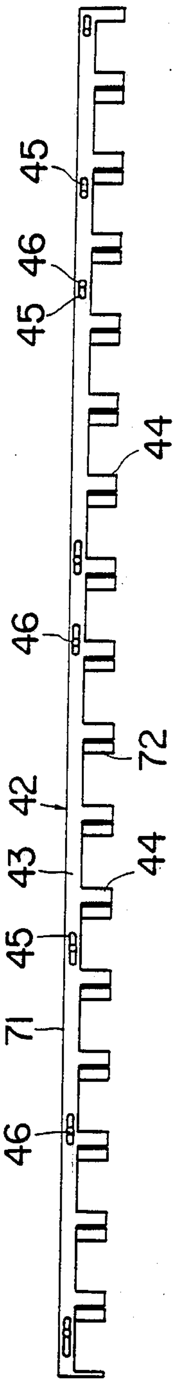
FIG. 9 is an elevational view of a preferred embodiment of a comb-like plate of a second intermittent carrying means.

As shown in FIG. 7, the second intermittent carrying means 21 comprises a comb-like teeth 26 (see FIGS. 8 and 9) having teeth 44 which pushes the main body 32 of the container 30 hung by a pair of rails 6, a forwarding means 35 which causes the comb-like teeth 26 to make a round trip motion along the carrying direction, a putting-in-and-out means 36 which drives the comb-like teeth 26 to move back and forth in the inside direction, and a position control means 37 which adjusts the back and forth motion of the comb-like teeth 26.

The comb-like teeth 26 comprises a teeth plate 42 which comprises a number of teeth 44 secured to a base plate 43 at regular intervals, a moving arm 39 the top end of which the teeth plate 42 is slidably secured to and the base end of which the work shaft 38 is fixed to, and a driving arm 70 the top end of which the teeth plate 42 is fixed.

The teeth plate 42 is secured to the moving arm 39 in such a manner that a pin 46 is fixed to the flange 52 secured to the top end of the moving arm 39, and the pin 46 is fixed through the long hole 45 created to the base plate 43. Therefore, the teeth plate 42 can be slided corresponding to the length of the long hole 45. Each pin 46 goes through two long holes 45 overlapped one another, and the piled teeth plates 42 are mutually slided in the opposite side directions.

The work shaft 38 is fixed to a supporting wall 40 at the base end, and is secured to a bearing 91 in such a manner that it can be slided in the axial direction and is rotatable (see FIG. 7). The base end of each moving arm 39 is firmly fixed to the work shaft 38. The moving arm 39 moves with the work shaft 38 along the carrying direction and it is turned certain angular amounts centering the work shaft 38. Therefore, the teeth plate 42 moves back and forth in the inside direction by the rotary motion of the work shaft, and it moves back and forth along the carrying direction by the sliding motion of the work shaft 38.

Figure 19:
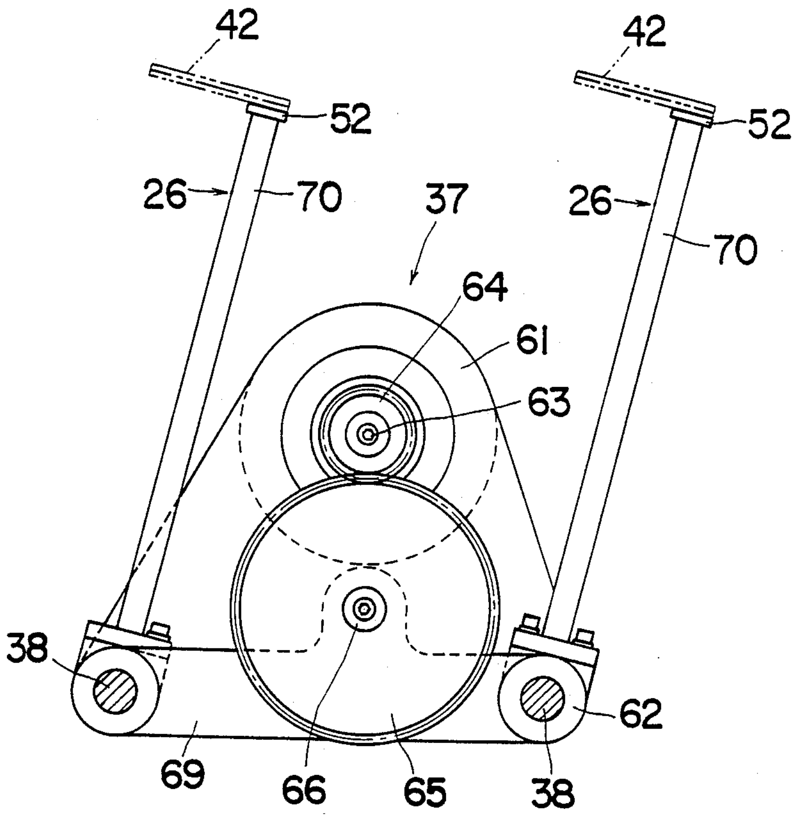
FIG. 19 is an elevational view, partly broken, of the embodiment shown in FIG. 17.

The top end of the driving arm 70 is fixed to the teeth plate 42 and the bottom end of which is fixed to the bearing 62 of the position control means 37 (see FIG. 19). The bearing 62 can be slided in the axial direction on the work shaft 38, so that the position of the teeth plate 42 toward the carrying route is adjusted.

Figure 10:
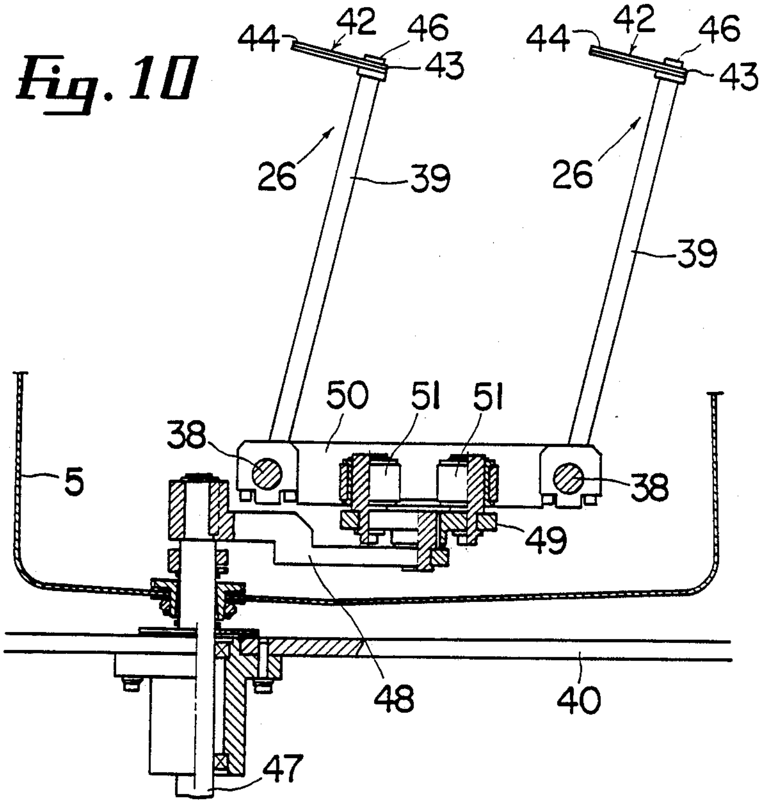
FIG. 10 is an elevational view, partly broken, of a forwarding means positioned in a fill-and-pack means.
Figure 11:
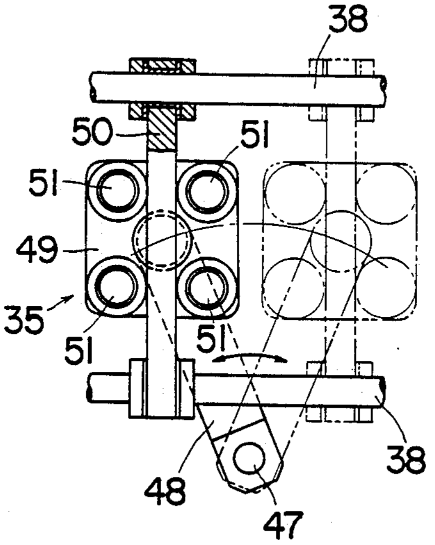
FIG. 11 is a top view, partly broken, of the embodiment shown in FIG. 10.
Figure 12:
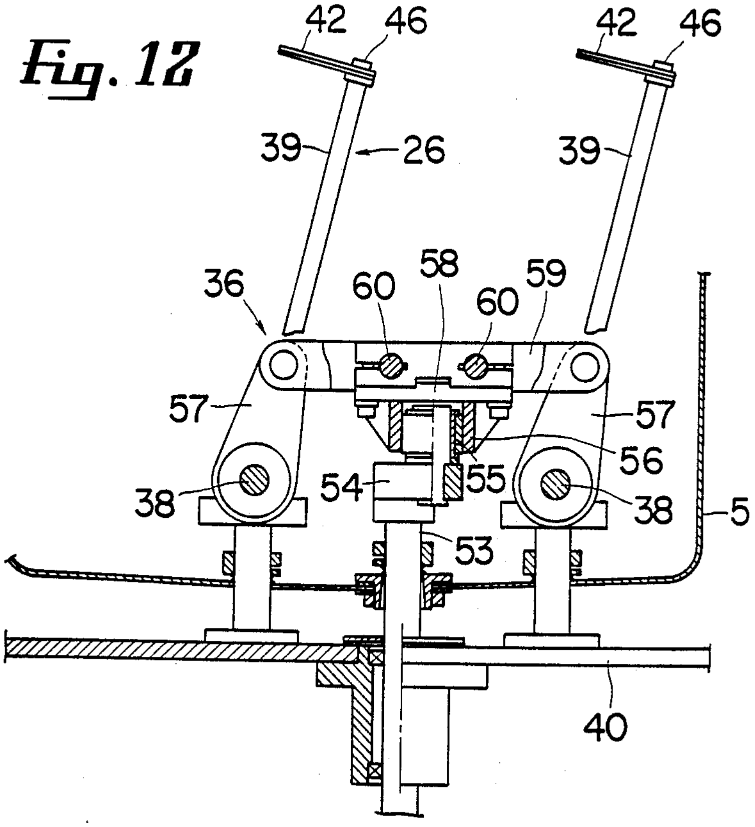
FIG. 12 is an elevational view, partly broken, of a putting-in-and-out means positioned in a fill-and-pack means.
Figure 13:
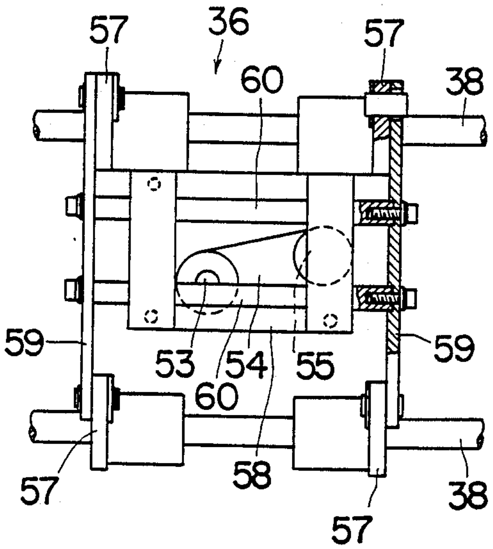
FIG. 13 is a top view, partly broken, of the embodiment shown in FIG. 12.
Figure 14:
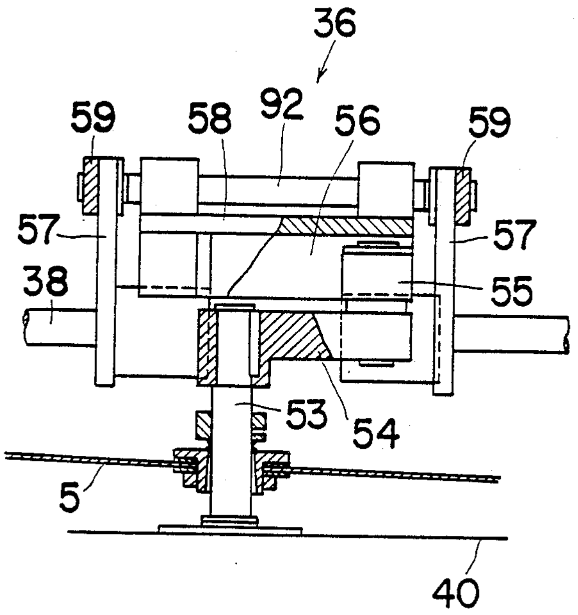
FIG. 14 is a side elevational view, partly broken, of the embodiment shown in FIG. 12.
Figure 15:
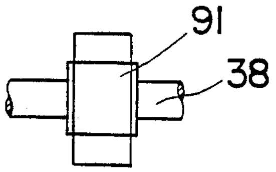
FIG. 15 is a top view of a preferred embodiment of a work shaft of a comb-like teeth.
Figure 16:
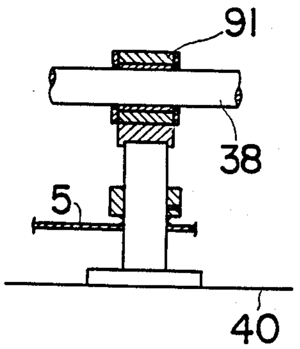
FIG. 16 is a side elevational view, partly broken, of the embodiment shown in FIG. 15.

The forwarding means 35 (see FIGS. 10 and 11) is arranged in such that a swing arm 48 is secured to the top end of the driving shaft 47 which is rotated by regular angular amounts by a power source (not shown in the drawings), and a securing plate 49, to which two pairs of rollers 51 are rotatably fixed, is rotatably secured to the top end of the driving arm 48. The swing plate 50, which is bridged between two work shafts 38 in such a manner that the work shafts 38 can be rotated but cannot be slided in the axial directions, is positioned between the rollers 51. In this forwarding means 35, the swing plate 50 is driven by a rotary motion of the driving shaft 47 via the rollers 51, so that the swing plate 50 is moved forward with the work shaft 38 in the axial directions, that is the carrying route directions. Caused by the motion of the swing plate 50, the comb-like teeth 26 moves along the axial directions of the work shaft 38.

As shown in FIGS. 12 to 16, the putting-in-and-out means 36 is arranged such that a turning arm 54 is secured to the top end of a turning rod 53 which is turned by regular angular amounts by a power source (not shown in the drawings), and a work roller 55 is rotatably secured to the top end of the turning arm 54. A pair of shifting arms 57 are firmly secured to each work shaft 38, and a pair of link plates 59 are rotatably secured to the top end of the work shafts 38. A pair of supporting shafts 92 are bridged between the link plates 59, and a fixing plate 58 securing a plate 56 is fixed beneath the pair of supporting shafts 92.

In this putting-in-and-out means 36, the work roller 55 is turned by the turning rod 53, the link plate 59 is moved by the turning rod 53, and the work shaft 38 is turned at regular angular amounts causing the comb-like teeth 26 to move back and forth toward the carrying route.

Figure 17:
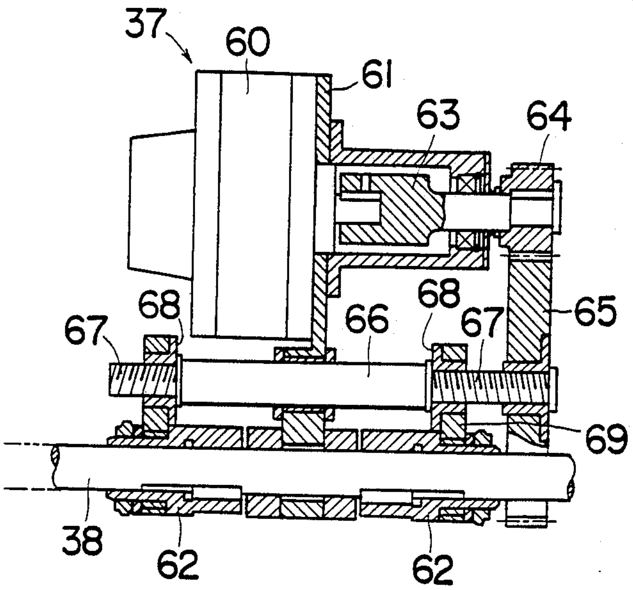
FIG. 17 is a side elevational view, partly broken, of a preferred embodiment of a position control means positioned in a fill-and-pack means.
Figure 18:
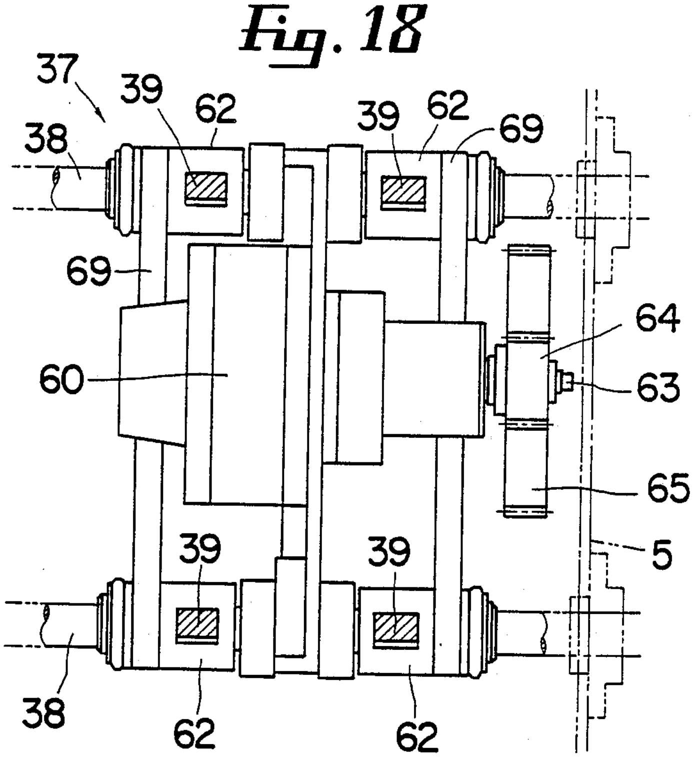
FIG. 18 is a top view of the embodiment shown in FIG. 17.

As shown in FIGS. 17 to 19, an air motor 60, a power source, is secured to the installing plate 61 which is rotatably secured to the work shaft 38. A drive gear 64 is fixed to the top end of the rotary shaft 63 of the air motor 60, and a rotary gear 65, which is rotated by the rotary gear, is fixed to the screw shaft 66 which is rotatably secured to the installing plate 61. A screw is died at both ends of the screw shaft 66, one is a right-handed screw and the other is a left-handed screw, and a nut 68 is secured to each screw. A nut 68 is secured to the connecting arm 69 both ends of which are connected to the bearing 62 in such a manner that it can be slided in the axial direction of the work shaft 38 but cannot be rotated.

As the screw shaft 66 is rotated by the air motor 60, the nuts 68 secured to the screws 67 at both ends of the screw shaft 66 move in the opposite directions. Therefore, the bearings 62 secured to the nuts 68 via the connecting arm 69 slide along the work shaft 38, and the teeth plate 42 connected to the bearing 62 via the driving arm 70 moves along the carrying route.

Figure 20:
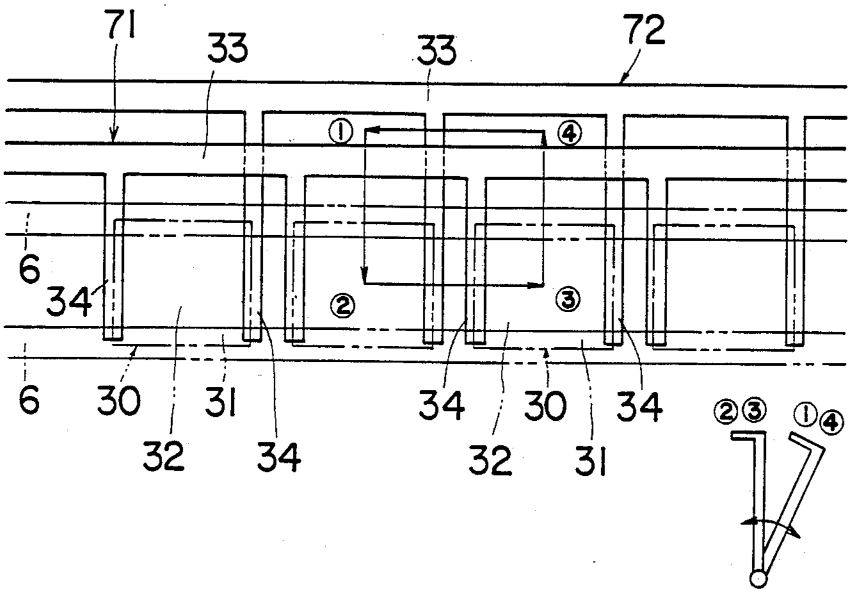
FIG. 20 is an explanatory illustration that shows an intermittent carrying movement of a comb-like teeth.

The motion of the second intermittent carrying means 21 will be described below referring to FIG. 20.

First, a distance between the teeth 44 of the first teeth plate 71 and the second teeth plate 72 is arranged similar to the width of the main body 32 of a container 30 by the position control means 37.

As the means 37 is driven, the comb-like teeth 26 at position (1) is moved to position (2) by the putting-in-and-out means 36 causing the teeth 44 to move forward in the carrying route to hold the main body 32 of a container 30 in between. Then, by the forwarding means 35, the comb-like teeth 26 is moved to position (3), so that the container 30 held by the teeth 44 is carried from position (2) to position (3). The comb-like teeth 26 then is moved back to position (4) from position (3), causing the teeth 44 to back away from the carrying route. After that, the comb-like teeth 26 is moved back to position (1) from position (4) by the forwarding means 35.

Figure 21:
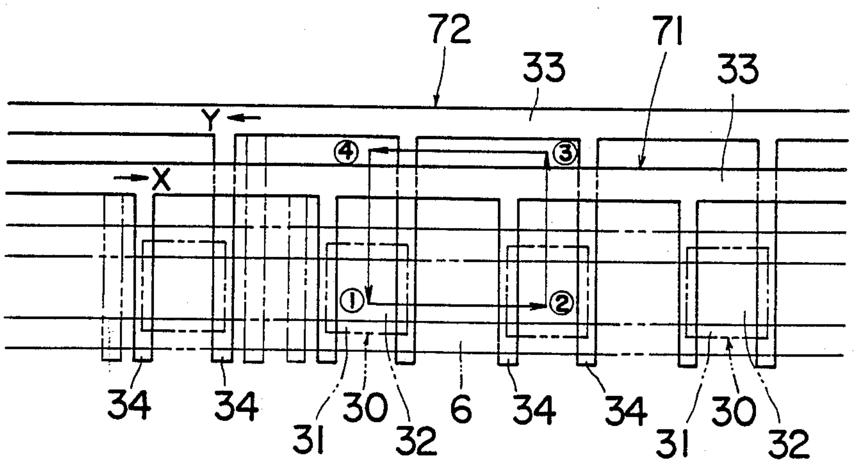
FIG. 21 is an explanatory illustration that shows that a teeth plate is adjustable.

In case a smaller sized container, for example, is applied, both bearings 62 are moved in the directions by the position control means 37 as shown in FIG. 21. By this movement, the first teeth plate 71 is moved in X direction and the second teeth plate 72 is moved in Y direction, so that the distance between the teeth 44 of the first teeth plate 71 and the second teeth plate 72 is narrowed and is adjusted to the width of the main body 32 the container 30.

The container sterilization means 2 of the machine for packaging in a non-germ atmosphere machine according to the present invention will be described in detail below.

Figure 22:
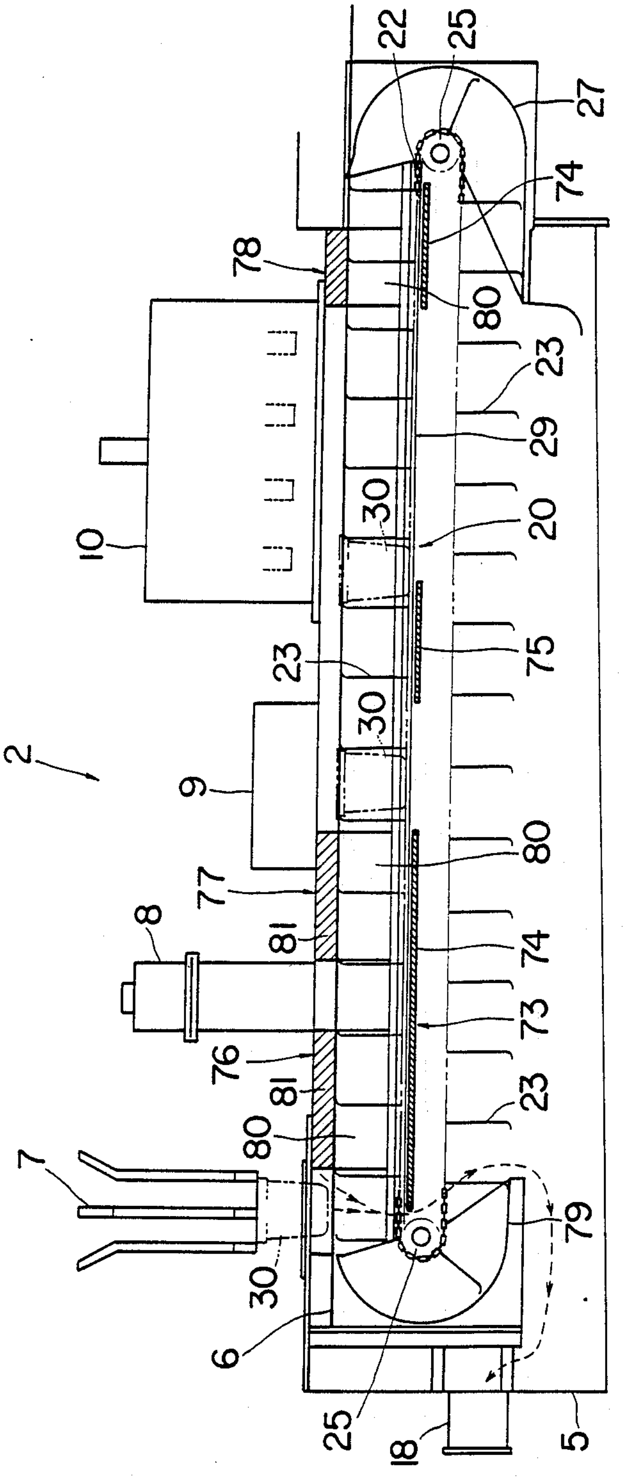
FIG. 22 is an elevational view of a preferred embodiment of a container sterilization means.
Figure 23:
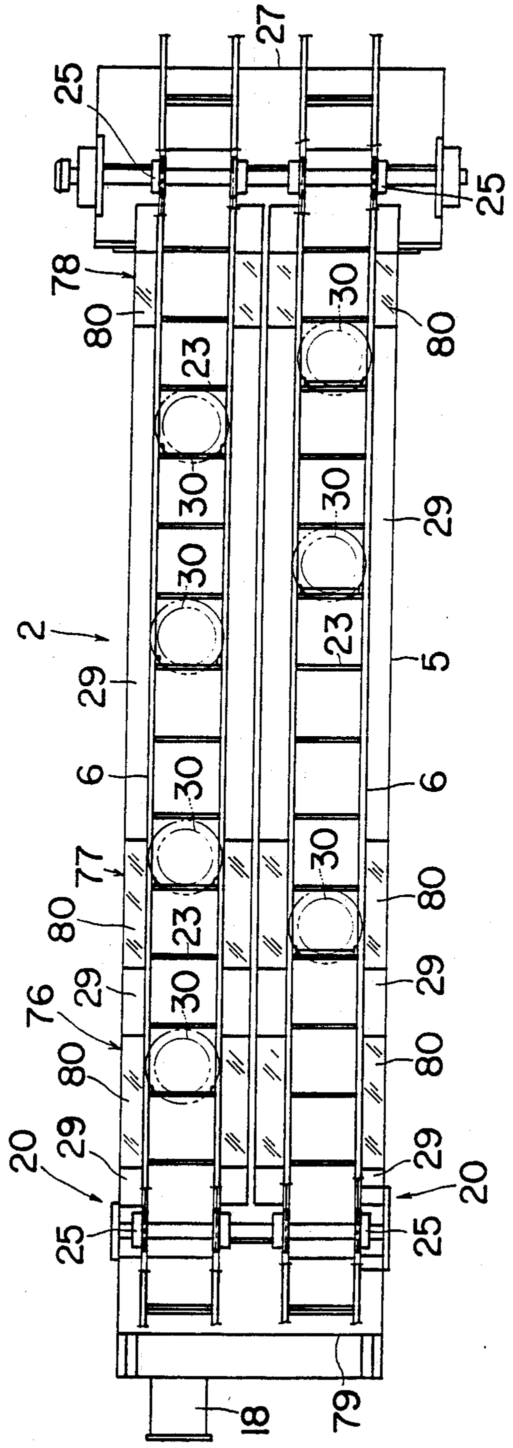
FIG. 23 is a top view of the embodiment, seen only below the pair of rails, shown in FIG. 22.
Figure 24:
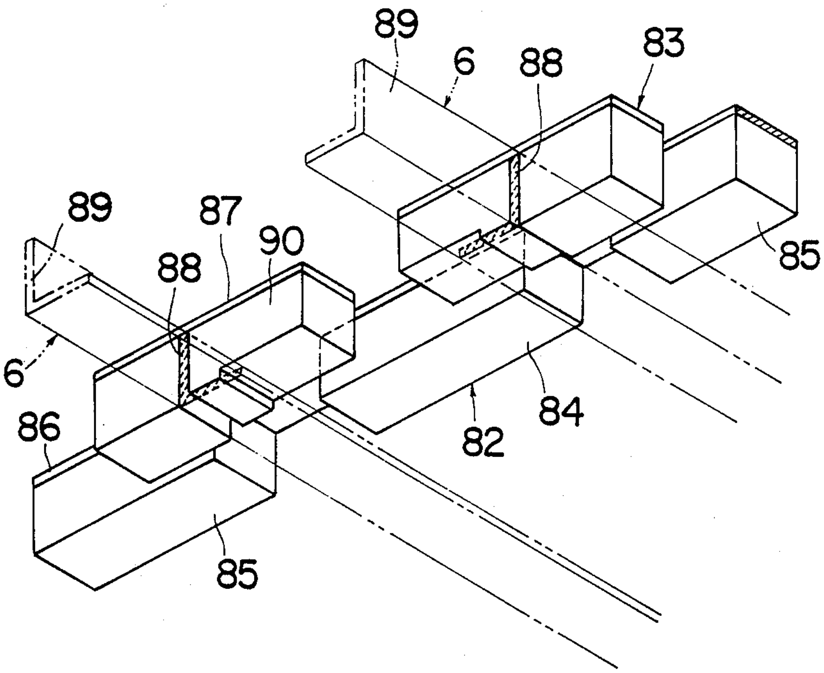
FIG. 24 is a perspective view of a combination of a sealed bar block and a pair of rails.

As shown in FIGS. 22 and 23, the container sterilization means 2 comprises a air current control means 73 to control the air flow in the container sterilization zone 16. The air current control means 73 comprises a first seal element 76 positioned between the container supplier 7 and the sterilization dispatcher 8, a second seal element 77 positioned between the sterilization dispatcher 8 and the ultraviolet rays apply means 9, a third seal element 78 positioned down the hot wind blow duct 10, a dividing plate 27 positioned at the down end of the first intermittent carrying means 20 dividing the container sterilization zone 16 and the fill-and-pack zone 17, a supporting sealed plate 75 positioned below the carrying route between the ultraviolet rays apply means 9 and the hot wind blow duct 10, and a end seal element 79 positioned at the top end of the carrying route.

Figure 26:
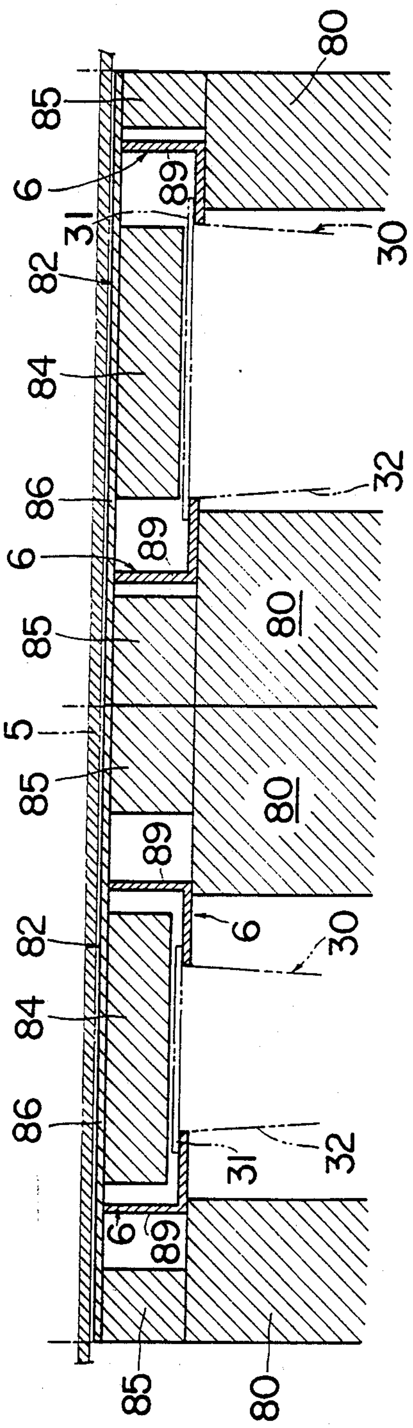
FIG. 26 is a side elevational view of a fixed block in the embodiment shown in FIG. 25.
Figure 27:
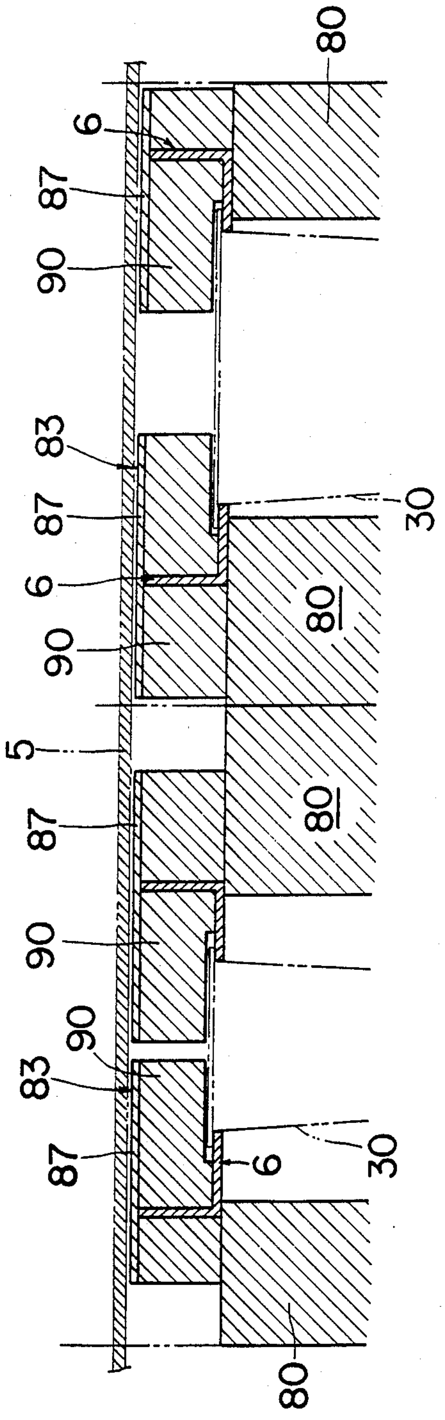
FIG. 27 is a side elevational view of a shifting block in the embodiment shown in FIG. 25.

As shown in FIGS. 6, 26 and 27, each seal element comprises a pair of sealed blocks 80, a sealed plate 74 and a sealed bar block 81.

The sealed bar block 81, as shown in FIGS. 24 to 27, is arranged such that a number of fixed blocks 82 and shifting blocks 83, both of which are positioned above the carrying route created by the rails 6, are one by one crossed each other at a right angle at regular intervals.

The fixed block 82 comprises a flat plate shaped securing plate 86, a main block 84 secured to the center of the undersurface of the securing plate 86, and supporting blocks 85 fixed to both sides of the undersurface of the securing plate 86.

The shifting block 83 comprises a pair of blocks 90 whose width is bigger than the distance between the main block 84 and the supporting block 85, and it is secured to the undersurface of the back plate 87. Each block 90 has a ditch 88 in which a rib 89 of the rail 6 is firmly adapted.

The sealed bar block 81 is arranged such that the fixed block 82 and the shifting block 83 are positioned alternatively to wind an air flow route to control the flow speed of the air. By re-arranging the distance between the fixed block 82 and the shifting block 83, the flow condition such as flow speed of the air can be controlled.

Figure 25:
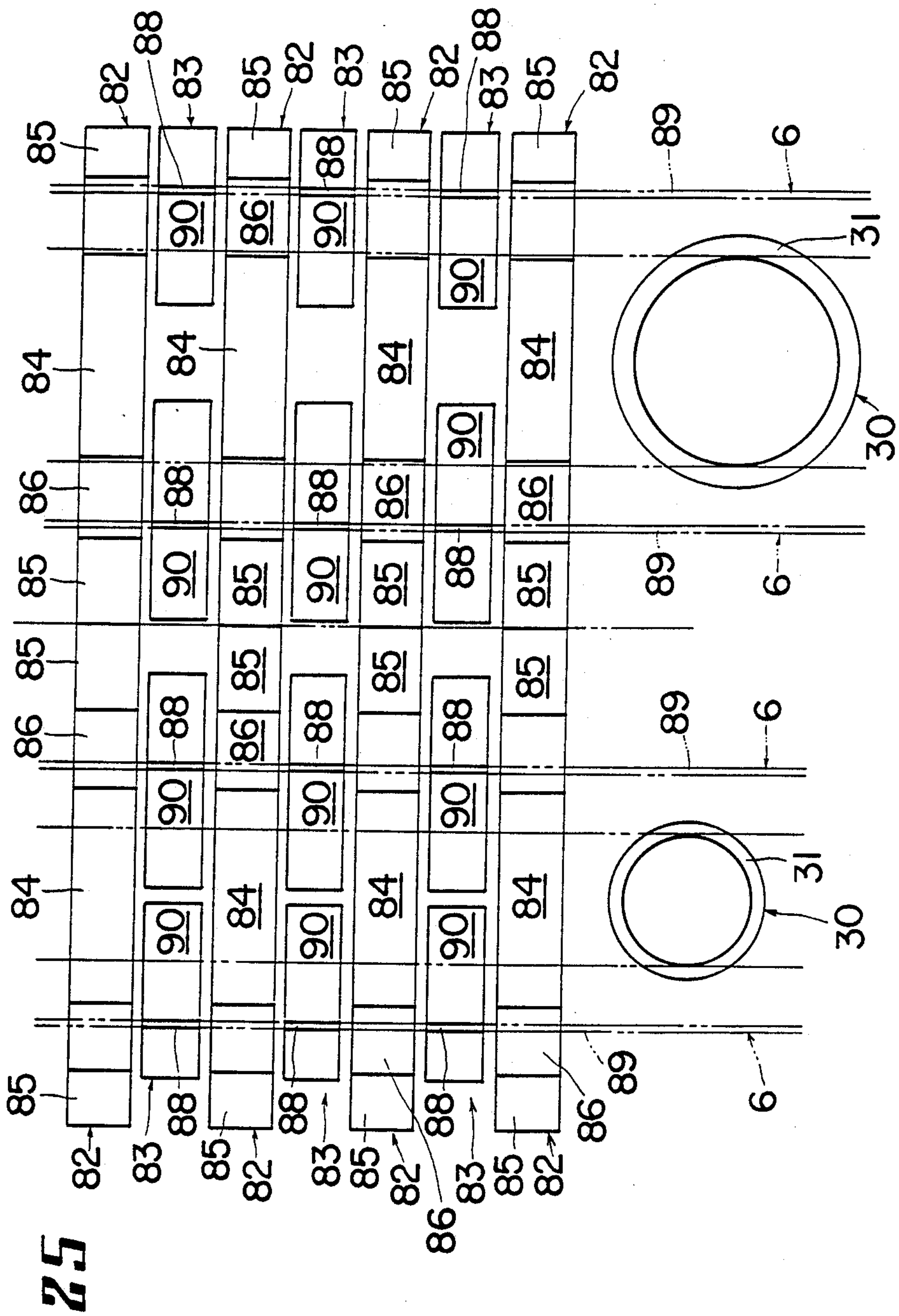
FIG. 25 is at op view that shows a gap between a sealed bar block and a pair of rails.

Since the shifting block 83 is fixed to the rail 6, it moves with the rail 6. Therefore, as shown in FIGS. 25 to 27 for example, the distance of the rails 6 shown on the right hand side of the drawings is narrowed to handle a smaller sized container 30 as shown in the left hand side of the same drawings. Each shifting block 83 moves with the rails 6 keeping the distance between the shifting block 83 and the fixed block 82 still the same, so that the air flow by the sealed bar block 81 can be controlled as it is required.

Further, since the fixed block 82 and the shifting block 83 are alternatively positioned making a regular distance in between, in the sealed bar blocks 81 of the first seal element 76 and the second seal element 77, dewing of the atomized sterilization agent flowing in the sealed bar block 81 can be minimized, so that the dewed sterilization agent is prevented from remaining on the container 30.

The dividing plate 27 is shaped like a tunnel wherein the pushing plate 23 can be turned around. The dividing plate 27, with the pushing plate 23, controls the air flow. Therefore, the quantity of the non-germ air flowing from the fill-and-pack means 17 to the container sterilization means 17 is controlled by the dividing plate 27 and the third seal element 78, so that the regularized air flow in the container sterilization zone 16 is not disturbed by the non-germ air.

The end seal element 79 is also shaped like a tunnel in which the pushing plate 23 is turned. The end seal element 79, in combination with the pushing plate 23, controls the air flow, and since the top end of the end seal element 79 is air tightly fixed to the sealed framework 5, the air flow in the end seal element 79 is further controlled. Therefore, as shown in FIG. 22, even though the air pressure in the container sterilization zone 16 is lower than outside, the air flowed in through the container supplier mouth is immediately flowed out with the air passed through the first seal element 76, so that the container sterilization zone 16 is not polluted by the outside air.

The remarkable effects of a machine for packaging in a non-germ atmosphere machine according to the present invention will be described below.

As described above, in a machine for packaging in a non-germ atmosphere, containers 30 are automatically sterilized, filled with food and sealed by lids while they are intermittently carried on a carrying route, so that the whole process can be accomplished easily.

Since the containers 30 are intermittently carried in the fill-and-pack zone 17 by the second intermittent carrying means 21 which is positioned beside the carrying route and not underneath the carrying route, a positioning means that adjusts the proper position of the container and supports it from underneath can be installed beneath the carrying route, which is the most preferable place to be installed, so that the filling and the sealing can be properly accomplished.

Concerning the fill-and-pack zone 17, only containers 30 are arranged to move along the carrying route, so that even though food is scattered when it is filled, only a certain part of the fill-and-pack zone 17 would be stained and the stain would not be carried to other parts by, for example, a carrying means. As a result, the fill-and-pack zone 17 can be kept clean for a long time.

Since the container sterilization zone 16 and the fill-and-pack zone 17 are divided and the non-germ air in the fill-and-pack zone 17 is arranged to flow in the container sterilization zone 16, the air in the container sterilization zone 16 containing an atomized sterilization agent does not flow into the fill-and-pack zone 17, so that food is prevented from being polluted by the sterilization agent.

Since the distance between teeth 44 is adjustable corresponding to the size of a container 30, the machine can be operated without replacing any parts when it is operated for different sized containers 30.

The distance between teeth 44 can be controlled outside of the sealed framework 5, so that the non-germ atmosphere in the sealed framework 5 is not disrupted.

The remarkable effects of a container sterilization means 2 comprised in a fill-and-pack in a non-germ atmosphere machine 1 is described below.

By the combination of the pushing plate 23 of the first carrying means 20 and the air current control means 73, the atomized sterilization agent in the container sterilization zone 16, the non-germ air flowing in from the fill-and-pack zone 17 and the outside air flowing through the container supplier mouth are exhausted through a regularized passage (see FIG. 22). Therefore, the atomized sterilization agent is prevented from being unnecessarily widely spreaded, so that containers 30 can completely dried.

Further, the atomized sterilization agent is prevented from leaking in the fill-and-pack zone 17, and the fill-and-pack zone 17 is prevented from being polluted by the outside air.

Since the seal elements 76, 77 are positioned beside the sterilization dispatcher 8, a lot of atomized sterilization agent can stay at the container carrying route beneath the sterilization dispatcher 8, so that sterilization of the containers 30 can completely be accomplished.

Since the sealed bar blocks 81 of the seal elements 76, 77 are positioned at places as shown in FIG. 22, the atomized sterilization agent applied from the sterilization dispatcher 8 in the downward direction arises and it is intercepted by the sealed bar blocks 81 being caused to stay there for a while, so that the atomized sterilization agent can fully be applied to the container completing the sterilization of the container.

The outside air is prevented from leaking in the container sterilization zone 16, so that the air flow in the container sterilization zone 16 is regularized.

Therefore, the container 30 can be properly sterilized and completely dried.

The supporting sealed plate 75 is arranged to bring some of the hot wind blown from the hot wind blow duct 10 in the direction of the ultraviolet rays apply means 9, so that a sterilized container 30 is pre-dried by the hot wind and that drying of the container 30 can better be accomplished.

What we claim is:

1. A machine for packaging in a non-germ atmosphere that intermittently carries a container hung by a flange on at least a pair of rails positioned in parallel in a non-germ atmosphere, the machine comprising:

a container sterilization zone, a first half of said machine wherein containers are sterilized, further comprising a pushing plate means which is positioned right beneath a container carrying route arranged by said pair of rails, wherein said pushing plate means intermittently pushes and carries said container, and a fill-and-pack zone, a second half of said machine comprising a fill-and-pack means wherein said container carried from said container sterilization means is filled with food and sealed, further comprising a bar-like element which moves back and forth along said carrying route and which also moves back and forth toward said carrying route, wherein said bar-like element intermittently carries said container.

2. A machine for packaging in a on-germ atmosphere comprising;

a sealed framework inside of which is non-germ atmosphere, at least a pair of rails positioned in parallel in said sealed framework, a container sterilization means positioned in said container sterilization zone in said sealed framework comprising a first intermittent carrying means, said first intermittent carrying means comprises an endless chain positioned beneath said carrying route and is driven intermittently, pushing plates being secured to said endless chain at regular intervals, and a fill-and-pack means positioned in said fill-and-pack zone comprising a second intermittent carrying means, said second intermittent carrying means comprises comb-like teeth, said comb-like teeth comprises bar-like teeth which moves back and forth along said carrying route and which also moves back and forth toward said carrying route, wherein a container is filled with food and is sealed with a lid while said container is carried by said second intermittent carrying means.

3. A machine for packaging in a non-germ atmosphere as claimed in claim 2 wherein said container sterilization means comprises a sterilization dispatcher; ultraviolet rays application means and a hot wind blow duct wherein said container is dried after said sterilization is completed in said container sterilization means.

4. A machine for packaging in a non-germ atmosphere comprising an intermittent carrying means which intermittently carries a container hung by a flange on a pair of rails, the intermittent carrying means comprising:

comb-like teeth which comprises teeth positioned at regular intervals, wherein each tooth pushes said container hung on said rails, a forwarding means which drives said comb-like teeth back and forth at regular intervals along said rails, a putting-in-and-out means which drives said comb-like teeth back and forth toward a carrying route, and a position control means which adjusts a distance between teeth of said comb-like teeth corresponding to the width of a container.

5. A machine for packaging in a non-germ atmosphere as claimed in claim 4 wherein said comb-like teeth of said intermittent carrying means comprise:

a teeth plate comprising a long-plate shaped base plate and teeth, each tooth of said teeth being secured to said base plate at regular intervals, a plurality of moving arms securing said teeth plate thereupon such that said teeth plate is able to slide thereupon, a driving arm securing said teeth plate thereupon, and a bar-like shaped work shaft firmly affixed to the bottom end of said moving arm, and being secured to a bearing in such a manner that it is rotatable and is able to slide along said rails.

6. A machine for packaging in a non-germ atmosphere as claimed in claim 4 said forwarding means of said intermittent carrying means comprises:

a swing plate firmly fixed to said work shaft of said comb-like teeth and extended in the side directions, a securing plate being secured to the top end of said swing plate, and at least a pair of rollers rotatably secured to said securing plate, said rollers being able to hold said work shaft.

7. A fill-and-pack in a non-germ atmosphere machine as claimed in claim 6 wherein said forwarding means is arranged such that said swing plate is bridged between said work shafts positioned in parallel, said pair of comb-like teeth being secured to said work shafts.

8. A machine for packaging in a non-germ atmosphere as claimed in claim 4 wherein said position control means of said intermittent carrying means comprises:

an installing plate rotatably secured to said work shaft of said comb-like teeth, an air motor, a power source, secured to said installing plate, a screw shaft rotatably secured to said installing plate and being rotated by said air motor, a connecting arm fixed to a nut which is secured to a screw of a screw shaft, and a bearing secured to said work shaft capable of sliding along said work shaft, securing said connecting arm capable of rotational, and firmly fixing the base end of said driving arm of said comb-like teeth.

9. A machine for packaging in a non-germ atmosphere as claimed in claim 4 wherein said putting-in-and-out means of said intermittent carrying means comprises:

a shifting arm, the base end thereof which is firmly secured to said work shaft of said comb-like teeth, being extended in the upward direction, a link plate rotatably secured to the ends of said shifting arm, plates firmly secured to said link plate counter facing each other, a turning arm, whose base end is firmly fixed to a turning rod which rotates between regular angular intervals, which swings at a right angle toward said work shaft, and a work roller rotatably secured to the top end of said turning arm and positioned between said plates such that it is capable of rotating and sliding between said plates.

10. A machine for packaging in a non-germ atmosphere as claimed in claim 9 wherein said putting-in-and-out means is arranged such that said link plate is bridged between said work shafts of said comb-like teeth positioned in parallel via a shifting arm.

11. A machine for packaging in a non-germ atmosphere comprising a container sterilization means, said container sterilization means comprising:

a sealed framework, inside thereof is a non-germ atmosphere, securing a container supply means, sterilization dispatcher, ultraviolet light application means and hot wind blow duct thereon, at least a pair of rails positioned horizontally in parallel in said sealed framework, an intermittent carrying means comprising an endless chain arranged to move intermittently and positioned beneath said pair of rails, and pushing plates secured to said endless chain at regular intervals, and an air current control means comprising seal elements around a container carrying route which controls the air flow in said sealed framework, and a dividing plate at the end of said carrying route which has an opening containers can be forwarded therethrough, one of said seal elements being positioned in front of said sterilization dispatcher, another seal element being positioned at the back of said sterilization dispatcher and another seal element being positioned at the back of said hot wind blow duct.

12. A machine for packaging in a non-germ atmosphere as claimed in claim 11 wherein said intermittent carrying means of said container sterilization means comprises:

a plurality of pushing plates, each comprising a flat plate and legs protracted in the backward from lower edges of said flat plate, and endless chain positioned in parallel beneath said pair of rails, a connecting rod which connects said legs of said pushing plate to said endless chain, and a chain guide being positioned such that said endless chain is guided by said chain guide so that it runs smoothly.

13. A machine for packaging in a non-germ atmosphere as claimed in claim 11 wherein said seal element of air current control means comprises:

a pair of sealed blocks whose outer surface is attached to said sealed framework and whose inner surface is positioned close to the side edges of said pushing plate, a sealed plate positioned beneath said endless chain, both side edges thereof are attached to said sealed framework, the center portion of the top surface thereof is positioned close to the bottom of said pushing plate and side edges thereof are attached to said sealed block, and a sealed bar block comprising a plurality of sealed bars positioned with a zigzag opening narrow space in between, said sealed bar block being positioned between said pair of sealed blocks.

14. A machine for packaging in a non-germ atmosphere as claimed in claim 13 wherein said container sterilization means is arranged such that the length of said seal element is longer than the distance between said pushing plates.

15. A machine for packaging in a non-germ atmosphere as claimed in claim 13 wherein said sealed bar block of said container sterilization means comprises:

fixed blocks each comprising a main block positioned above said container carrying route and supporting blocks positioned at both ends of said main block having a fixed space between them, the edge surfaces of said supporting blocks being attached to said sealed framework and undersurface of said supporting blocks being attached to said sealed block, and shifting blocks positioned between said fixed blocks facing said fixed space between said main block and said supporting blocks, said fixed blocks and said shifting blocks being alternatively positioned with a little distance between them.

16. A machine for packaging in a non-germ atmosphere as claimed in claim 11 wherein said sealed plates of a first seal element and a second seal element are continuously united.

17. A machine for packaging in a non-germ atmosphere as claimed in claim 11 wherein said container sterilization means comprises:

a container sterilization means comprised of said sterilization dispatcher, ultraviolet rays apply means and hot wind blow duct, and a supporting sealed plate is positioned along said container carrying route between said ultraviolet rays apply mouth and said hot wind blow duct.

18. A machine for packaging in a non-germ atmosphere as claimed in claim 11 wherein said container sterilization means comprises a sucking duct at the up stream of said container carrying route.

* * * * *